(12) United States Patent
Kim

(10) Patent No.: US 7,535,526 B1
(45) Date of Patent: May 19, 2009

(54) TRANSMISSION-REFLECTION TYPE LIQUID CRYSTAL DISPLAY DEVICE HAVING A LIGHT TRANSMITTING REGION IN A REFLECTING FILM

(75) Inventor: Yong Beom Kim, Kunpo-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 09/559,403

(22) Filed: Apr. 26, 2000

(30) Foreign Application Priority Data
May 26, 1999 (KR) .................. 1999-18970

(51) Int. Cl.
G02F 1/1335 (2006.01)
G02F 1/1343 (2006.01)

(52) U.S. Cl. ...................... 349/113; 349/139

(58) Field of Classification Search ............. 349/113, 349/87, 98, 139
See application file for complete search history.

(56) References Cited

U.S. PATENT DOCUMENTS

| | | | | |
|---|---|---|---|---|
| 4,017,156 A | * | 4/1977 | Moriyama et al. | 349/78 |
| 5,408,345 A | * | 4/1995 | Mitsui et al. | 349/42 |
| 5,929,463 A | * | 7/1999 | Stupp et al. | 257/59 |
| 5,995,178 A | * | 11/1999 | Fujikawa et al. | 349/55 |
| 6,061,122 A | * | 5/2000 | Hoshino et al. | 356/71 |
| 6,091,464 A | * | 7/2000 | Song | 349/38 |
| 6,133,980 A | * | 10/2000 | Faris | 349/176 |
| 6,281,952 B1 | * | 8/2001 | Okamoto et al. | 349/12 |
| 6,295,109 B1 | * | 9/2001 | Kubo et al. | 349/119 |
| 6,326,641 B1 | * | 12/2001 | Choi | 257/57 |
| 6,411,347 B1 | * | 6/2002 | Park et al. | 349/39 |
| 2001/0046000 A1 | * | 11/2001 | Kim et al. | 349/43 |

* cited by examiner

*Primary Examiner*—David Nelms
*Assistant Examiner*—Hoan C Nguyen
(74) *Attorney, Agent, or Firm*—Birch, Stewart, Kolasch & Birch, LLP

(57) ABSTRACT

A transmission-reflection type liquid crystal display device which may be driven as a transmission type or reflection type display by user selection, according to an external environment. Each pixel contains a reflector to reflect ambient light when the display is used as a reflection-type display. Each pixel also contains a light transmitting region to allow light to pass by the reflector when the display is used as a transmission-type display.

15 Claims, 5 Drawing Sheets

TRANSMISSION-REFLECTION TYPE LIQUID CRYSTAL DISPLAY DEVICE HAVING A LIGHT TRANSMITTING REGION IN A REFLECTING FILM

BACKGROUND OF THE INVENTION

1. Field of the Invention

The present invention relates to a liquid crystal display device, and more particularly to a reflection type liquid crystal display device that can also function as a transmission type device.

2. Description of Related Art

A liquid crystal display device (LCD) is widely used as a planar display device for a variety of portable computers and portable televisions.

Liquid crystal display devices are classified into two types according to their use of a light source. One type is a transmission type liquid crystal display device, which uses a backlight provided on the back face of a liquid crystal panel as a light source. The other type is a reflection type liquid crystal display device, which uses an external light source such as sunlight or an indoor lamp.

It is difficult to decrease the volume, weight and power consumption of a transmission type LCD because of the presence of the backlight which is used as a light source. For a reflection type liquid crystal display device, the volume, weight and power consumption are low, because the reflection device need not use the backlight. However, if an external environment is dark, the reflection type liquid crystal display device cannot be used.

SUMMARY OF THE INVENTION

In order to overcome the problems of the related art, an object of the present invention is to provide a transmission-reflection type liquid crsytal display device which can be driven as a reflection type as well as transmission type.

In order to achieve the object, a transmission-reflection type liquid crystal display device according to an aspect of the present invention includes a first transparent substrate; a second transparent substrate; a liquid crystal layer between the first transparent substrate and the second transparent substrate; a linear polarizer on the second transparent substrate; a circular polarizer on an outer side of the first transparent substrate; and a reflecting film on an inner side of the first transparent substrate adjacent to the liquid crystal layer, the reflecting film defining a light-transmitting region.

A transmission-reflection type liquid crystal display device according to another aspect of the present invention includes a plurality of gate lines and data lines defining a plurality of pixels; a transistor in each pixel, a gate of which is connected to a gate line and a second terminal of which is connected to a data line; a reflecting film formed in each pixel and connected to a third terminal of the transistor in each pixel, wherein a light-transmitting region through which light may pass exists between the gate line and the reflecting film in each pixel.

A liquid crystal display device capable of transmitting light from a backlight and reflecting ambient light according to another aspect of the present invention includes a lower transparent substrate; an upper transparent substrate; a liquid crystal layer between the lower transparent substrate and the upper transparent substrate; a linear polarizer on the upper transparent substrate; a $\lambda/4$ phase shift plate between the linear polarizer and the liquid crystal layer; a circular polarizer below the lower transparent substrate; and a reflecting film for reflecting ambient light on the lower transparent substrate adjacent to the liquid crystal layer, the reflecting film defining a light-transmitting region for transmitting light from the backlight.

A liquid crystal display device capable of transmitting light from a backlight and reflecting light from a front of the device according to still another aspect of the invention includes a polarizing layer; a phase shifting layer adjacent to the polarizing layer; a reflecting layer to reflect light from the front of the device, the reflecting film at least partially defining a light-transmitting region through which light from the backlight may pass; and a liquid crystal layer between the phase shifting layer and the reflecting layer.

DETAILED DESCRIPTION OF THE INVENTION

Figure 1:
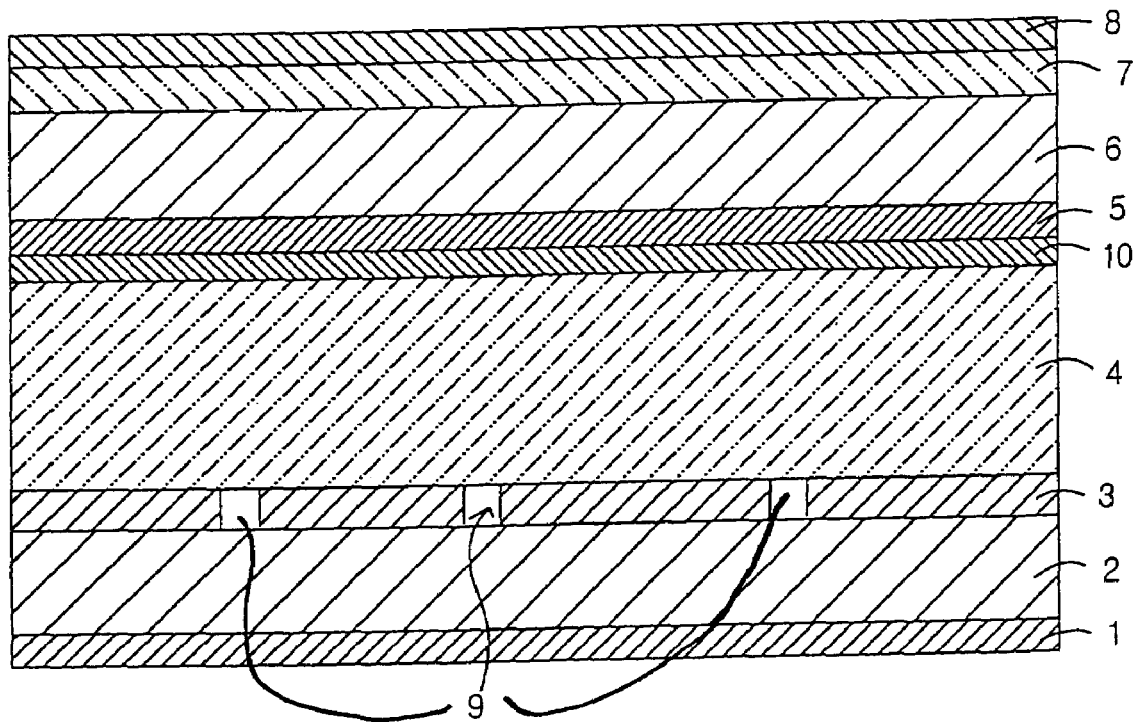
FIG. 1 is a sectional view showing a transmission-reflection type liquid crystal display device according to the present invention.

Hereinafter, a transmission-reflection type liquid crystal display device according to the present invention is described in detail referring to the drawings.

As shown in FIG. 1, a liquid crystal display device according to the present invention includes a first transparent substrate 2 and a second transparent substrate 6 where a plurality of pixel regions are defined. A liquid crystal layer 4 is located between the first transparent substrate 2 and the second transparent substrate 6. A linear polarizer 8 and a $\lambda/4$ phase shift plate 7 ($\lambda$ is a wavelength of light) are provided on an external side of the second transparent substrate 6. A filter layer 5 and a transparent common electrode 10 are provided on the inner side of the second transparent substrate 6. A right-handed cholesteric liquid crystal left-handed circular polarizer 1 also is provided on the outer side of the first transparent substrate 2. The polarizer 1 makes visible light form left-handed circular polarization. A reflecting film 3 is provided on the inner side of the first transparent substrate 2.

The reflecting film 3 is formed from a metal layer such as aluminum (Al), which is laminated on the first transparent substrate 2 and then patterned. Also the reflecting film 3 is formed on every pixel region. Although not illustrated in FIG. 1, the reflecting film 3 is electrically insulated from a reflecting layer of other pixel regions. The reflecting film 3 also is connected to a thin film transistor (TFT, not shown in the drawing) formed in every pixel region of the first transparent substrate 2. Thus, the reflecting film 3 functions as a pixel electrode.

The thin film transistor functions as a switching element which transmits a pixel voltage to the reflecting film 3. When a pixel voltage is transmitted to the reflecting film 3, the pixel voltage is across the liquid crystal layer 4 situated between the reflecting film 3 and a transparent common electrode 10. The arrangement of liquid crystal molecules in layer 4 is controlled by the pixel voltage. A light-transmitting region 9, through which a light can be transmitted, is formed on every pixel region of the first transparent substrate 2. This light-transmitting region 9 may be a cavity or a solid transparent material. The reflecting film 3 is formed in the entire pixel region except for the light-transmitting region 9. The plural pixel regions are defined by multiple gate lines and data lines (not shown in drawings) which intersect each other on the first transparent substrate 2.

The right-handed cholesteric liquid crystal left-handed circular polarizer 1 includes a right-handed cholesteric liquid crystal having a pitch $p=\lambda/n$, where $\lambda$ is a visible wavelength, and n is an average index of refraction of an extraordinary ray and an ordinary ray. That is, the cholesteric liquid crystal includes all pitches in a range of (380 nm~800 nm)/n. Also, only a right-handed circularly polarized visible component is reflected, and the other components are transmitted through the circular polarizer 1. In other words, the left-handed circular polarizer 1 only transmits left-handed circularly polarized components of incident light.

The liquid crystal layer 4 is oriented to introduce a phase shift of $\lambda/4$ to visible light which passes through the liquid crystal layer 4 when there is no voltage across the layer. The orientaion of the liquid crystal is determined by the two orientation layers (not shown in drawings) which are adjacent to respective upper and lower faces of the liquid crystal layer 4.

In order to introduce a phase shift of $\lambda/4$ to light, the $\lambda/4$ plate 7 has an interval angle of 45° between a slow axis in the plate and a polarization axis (direction of linear polarization) of a linear polarizer.

Figure 2A:
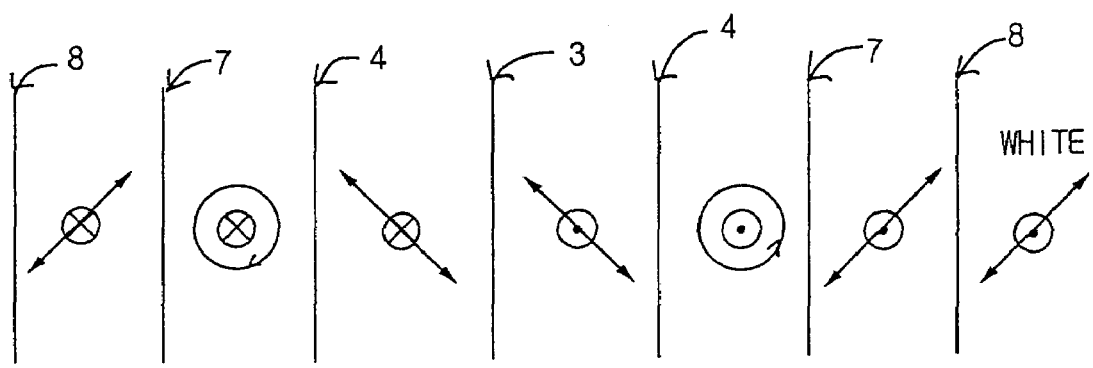
FIG. 2A and FIG. 2B show the progress of light, when the transmission-reflection type liquid crystal display device according to the present invention acts as a reflection type display.
Figure 2B:
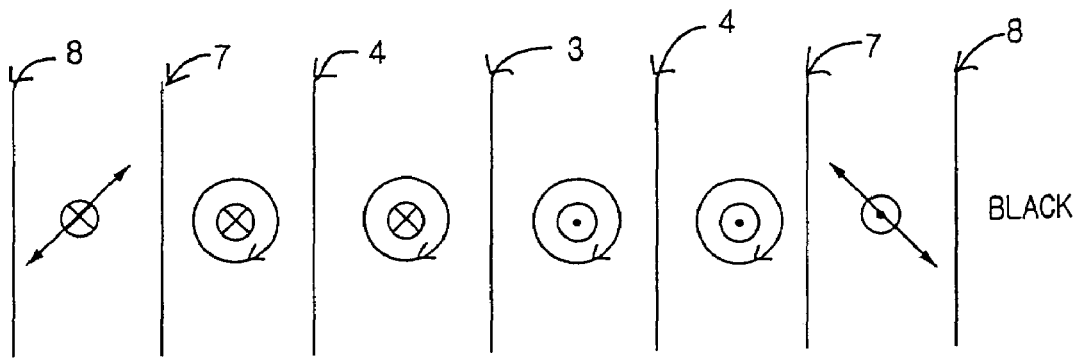

When the liquid crystal display device according to the present invention is operated as a reflection type device, its operation is described referring to FIG. 2A and FIG. 2B; and a progressing direction of a light is shown on the basis of an observer confronting with the second transparent substrate 6 in the drawing.

When a pixel voltage is not connected to the reflecting film 3, as shown in FIG. 2A, only components with a polarization axis parallel to that of linear polarizer 8 in the incident rays pass inward through the linear polarizer 8. The linearly polarized light passes through the $\lambda/4$ plate 7 and becomes right-handed circular polarized. Then the right-handed circularly polarized light passes through the liquid crystal layer 4 and becomes linearly polarized perpendicularly to the polarization axis of the linear polarizer 8. This light then infringes on the reflecting film 3. The linearly polarized light reflected from the reflecting film 3 passes through the liquid crystal layer 4 and becomes right-handed circular polarized. Then the light passes through the $\lambda/4$ plate 7 and becomes linearly polarized in a parallel direction to polarization axis of the linear polarizer 8. Therefore, the light passes outward through the linear polarizer 8 just as it is, so that a bright image (e.g., white) is displayed. Other colors of light may be displayed, depending on the location along the color filter 5.

When a pixel voltage is connected to the reflecting film, as shown in FIG. 2B, only components with a polarization axis parallel to the linear polarizer 8 in the incident rays pass inward through the linear polarizer 8. The linearly polarized light passes through the $\lambda/4$ plate 7 and becomes right-handed circular polarized. Then the right-handed circularly polarized light passes through the liquid crystal layer 4 without change. Such light infringes on the reflecting film 3. The right-handed circularly polarized light striking the reflecting film 3 is reflected and is changed to a left-handed circular polarization. Such light passes through the liquid crystal layer 4 without change. The light passes through the $\lambda/4$ plate 7 and becomes linearly polarized having a perpendicular direction to the polarization axis of the linear polarizer 8. Therefore, the light does not pass out through the linear polarizer 8, and a dark image (e.g., black) is displayed.

Figure 3A:
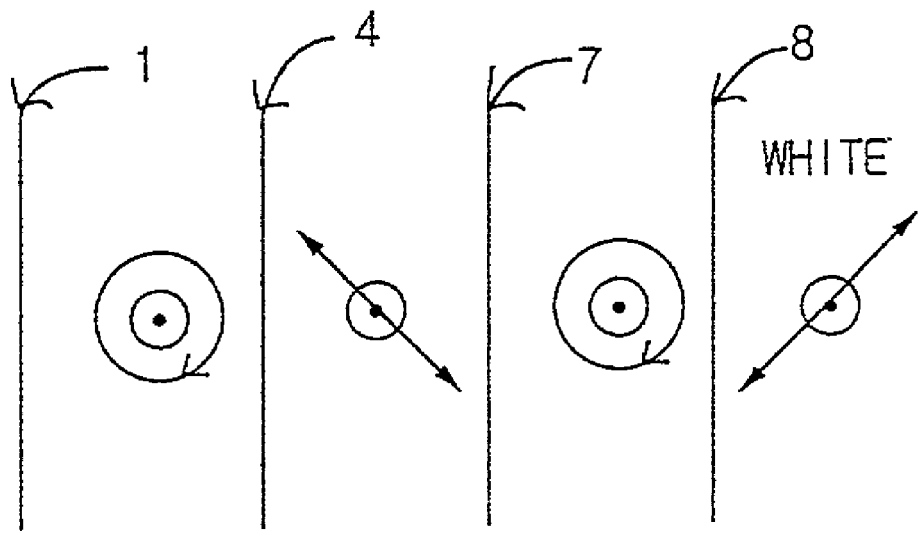
FIG. 3A and FIG. 3B show the progress of light, when the transmission-reflection type liquid crystal display device according to the present invention acts as a transmission type display.
Figure 3B:
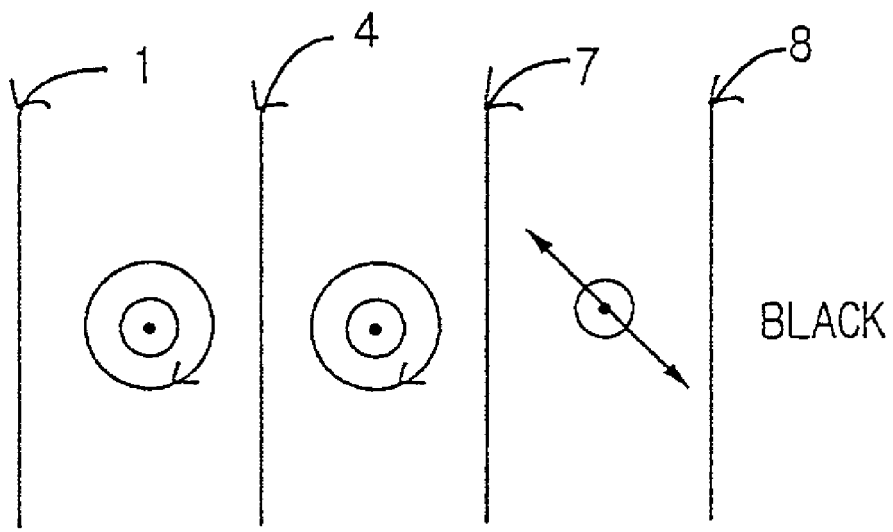

When the liquid crystal display device according to the present invention is operated as a transmission type, such operation is described referring to the FIG. 3A and FIG. 3B. A progressing direction of a light is shown on the basis of an observer confronting with the second transparent substrate 6 in the drawing.

When a pixel voltage is not impressed on the reflecting film 3, as shown in FIG. 3A, light generated from a backlight (not shown in drawings), which is provided confronting the left-handed circular polarizer 1, enters the left-handed circular polarizer 1. Only the left-handed circularly polarized components of the visible light pass through the left-handed circular polarizer 1. The left-handed circularly polarized light also passes through the light-transmitting region 9 and then passes through the liquid crystal layer 4, thereby becoming linearly polarized in a perpendicular direction to the polarization axis of the linear polarizer 8. The linearly polarized light then passes through the $\lambda/4$ plate 7 to become left-handed circular polarized, and only linearly polarized components having a direction parallel to a polarization axis of a linear polarizer 8 in the left-handed circularly polarized light passes through the linear polarizer 8. As a result, bright image (e.g., white) is displayed.

When a pixel voltage is impressed on the reflecting film 3, as shown in FIG. 3B, light generated from the backlight enters the left-handed circular polarizer 1. Only the left-handed circularly polarized components of the visible light pass through the left-handed circular polarizer 1. Further, the left-handed circularly polarized light passes through the light-transmitting region 9, and then passes through the liquid crystal layer 4 unchanged. The light also passes through the $\lambda/4$ plate 7, to become linearly polarized in a perpendicular direction to the polarization axis of the linear polarizer 8. Therefore, the light is intercepted by the linear polarizer 8 so that dark image (e.g., black) is displayed.

Figure 4:
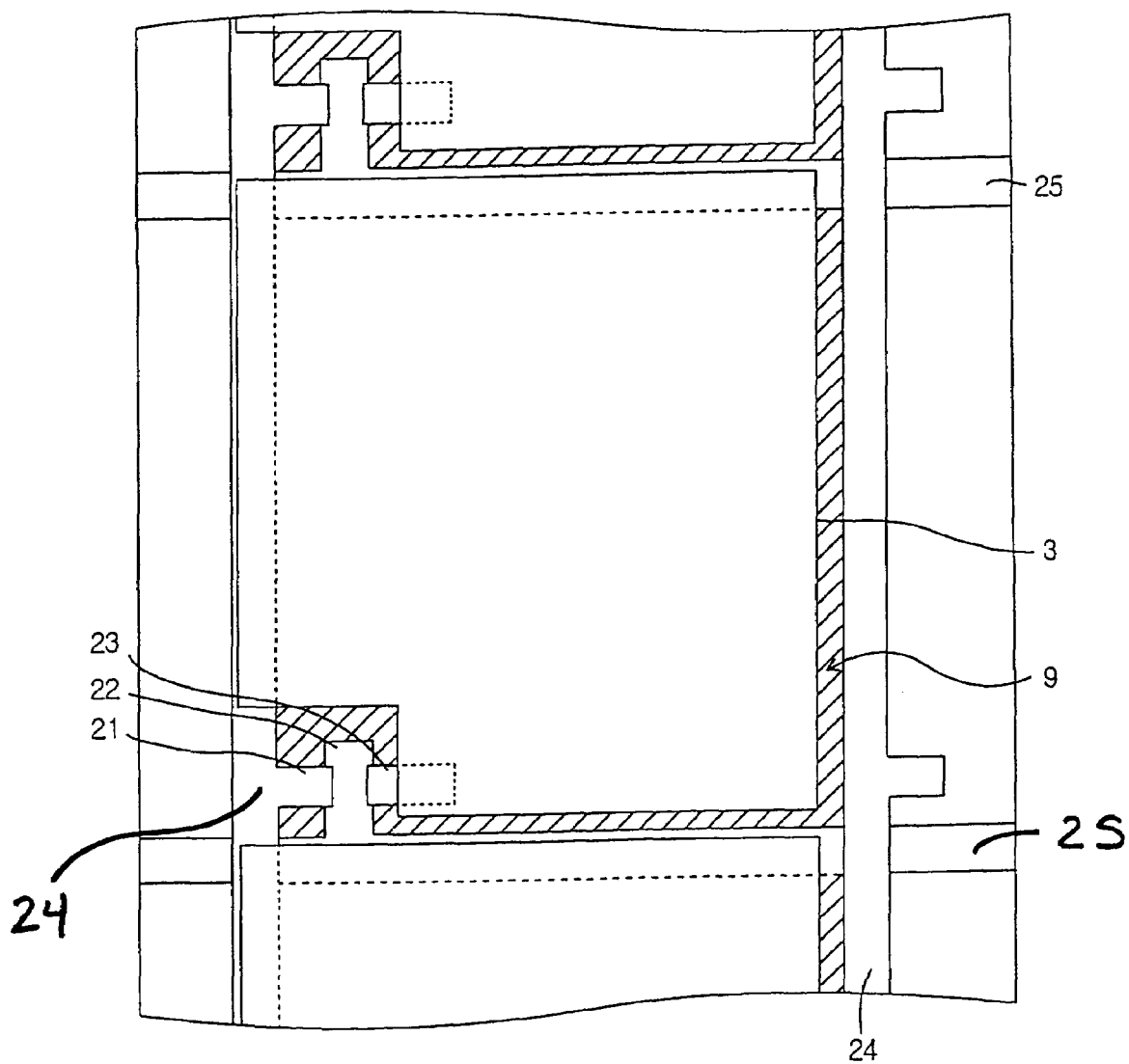
FIG. 4 is a plan view showing an electrode structure of the liquid crystal display device according to the present invention.

FIG. 4 is a planar view showing an electrode structure which is provided on the first transparent substrate 2 of FIG. 1. Only one complete pixel region is represented for ease of description. A common region between two adjacent gate lines 25 and two adjacent data lines 24 represents one pixel region.

The reflecting film 3 is connected to a drain electrode 23 of a thin film transistor. A gate electrode 22 of the thin film transistor is connected to the gate line 25, and a source electrode 21 of the thin film transistor is connected to a data line 24.

Figure 5:
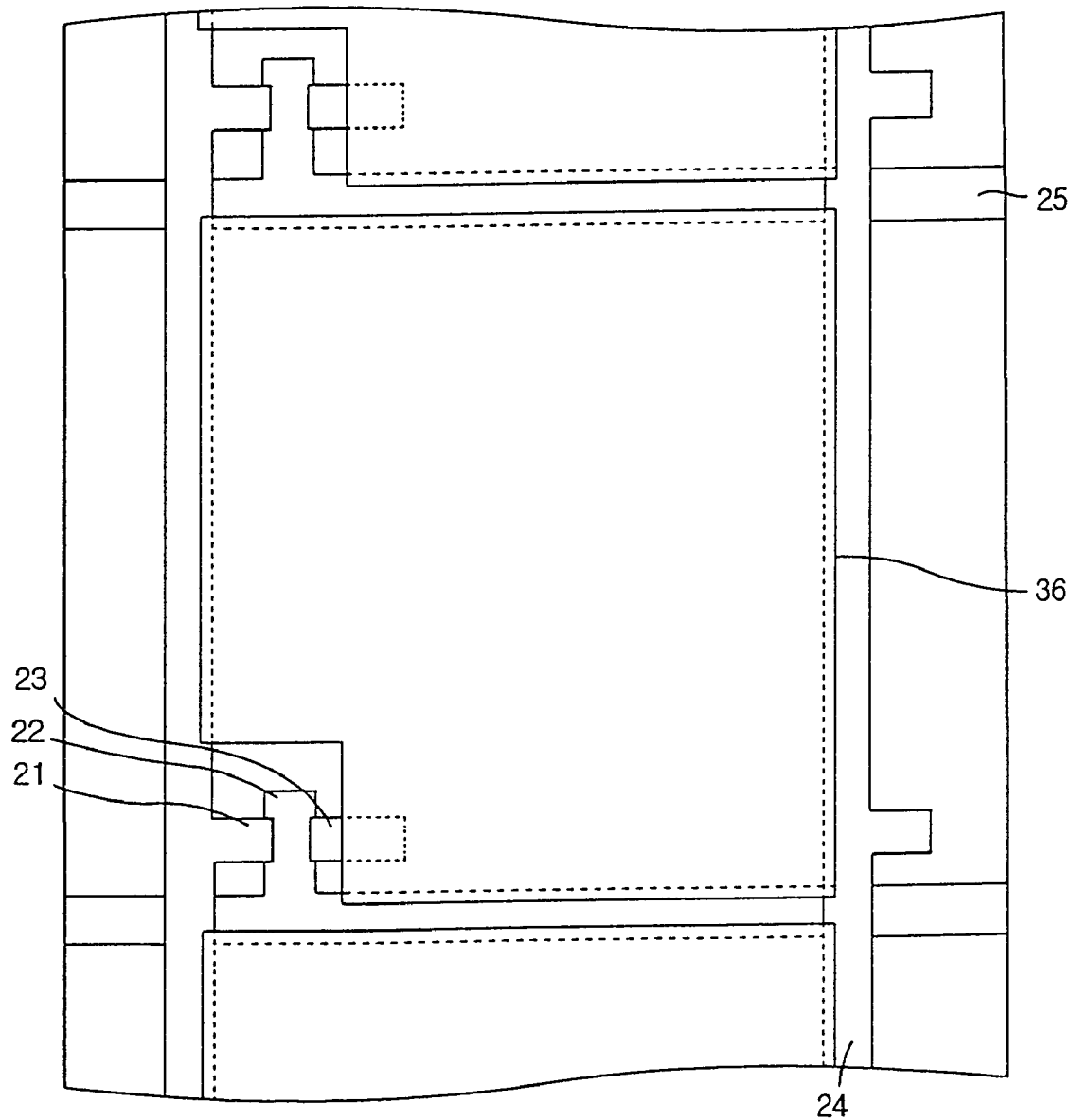
FIG. 5 is a plan view showing an electrode structure of the liquid crystal display device according to the conventional art.

By contrast, in the conventional reflection type liquid crystal display device shown in FIG. 5, the reflecting film 36 overlaps with the every inner edge of the gate line 25 and the data line 24, in order to form a storage capacitance. In the FIG. 5, elements having the same structure as elements shown in FIG. 4 are represented by the same reference numbers, and further description thereof is omitted. In this conventional case, although not illustrated in the drawing, the gate line 25 and the data line 24 are insulated from each other by an insulating layer provided between the gate line and the data line. The data line 24 and the reflecting film 3 are insulated from each other by an insulating layer provided between the data line and the reflecting film.

But in the present invention shown in FIG. 4, in order to form the light-transmitting region 9 represented by a gap, the edges of the lower side and the right side of the reflecting film 3 (adjacent gate line 25 and data line 24) have regular gaps to prevent adjacent films 3 from contacting each other. Also, in order to form a storage capacitance, the edges of the upper side and the left side in the reflecting film 3 entirely overlap the gate line 25 and the data line 24.

The transmission-reflection type liquid crystal display device according to the present invention can be driven as a transmission type or reflection type display by the selection of users, depending on an external environment.

Different embodiments of this invention may be made without departing from the spirit and scope thereof, it is to be understood that the invention is not limited to the specific embodiments thereof except as defined in the appended claims.

What is claimed is:

1. A transmission-reflection type liquid crystal display device, comprising:
    a first transparent substrate;
    a second transparent substrate;
    a liquid crystal layer between the first transparent substrate and the second transparent substrate;
    a linear polarizer on the second transparent substrate;
    a cholesteric liquid crystal polarizer on an outer side of the first transparent substrate, the cholesteric liquid crystal polarizer including a right handed helical cholesteric liquid crystal having a range of pitch values of (380 nm-800 nm)/n, where n is an average index of refraction of the cholesteric liquid crystal; and
    a reflecting film on an inner side of the first transparent substrate adjacent to the liquid crystal layer, the reflecting film functioning as a pixel electrode and defining a light-transmitting region, wherein said light transmitting region is disposed between an inner edge of a gate line and a side of an outer edge periphery of said reflecting film and between an inner edge of a data line and a side of an outer edge periphery of said reflecting film in each pixel, a first opposing side of said reflecting film overlapping more than half the width of an adjacent gate line, and a second opposing side of said reflecting film overlapping more than half the width of an adjacent data line.

2. The transmission-reflection type liquid crystal display device of claim 1, further comprising:
    a λ/4 phase shift plate between the linear polarizer and the liquid crystal layer.

3. The transmission-reflection type liquid crystal display device or claim 1, wherein when a voltage is not impressed on the liquid crystal layer, the liquid crystal layer imparts a phase shift of λ/4 to light transmitted through the liquid crystal layer.

4. The transmission-reflection type liquid crystal display device of claim 1, further comprising:
    a color filter between the linear polarizer and the liquid crystal layer.

5. The transmission-reflection type liquid crystal display device of claim 1, further comprising:
    a transparent common electrode between the linear polarizer and the liquid crystal layer.

6. The transmission-reflection type liquid crystal display device of claim 1, wherein the pixel electrode is formed from an aluminum metal layer.

7. A transmission-reflection type liquid crystal display device, comprising:
    a plurality of gate lines and data lines defining a plurality of pixels;
    a transistor in each pixel, a gate of which is connected to gate line and a second terminal of which is connected to a data line;
    a reflecting film functioning as a pixel electrode formed in each pixel and connected to a third terminal of the transistor in each pixel, a first outer edge at a side of said reflecting film overlapping more than half the width of one of said gate lines, while an outer edge at an opposing side of said reflecting film does not overlap an inner edge of an adjacent gate line, and a second outer edge of said reflecting film overlapping more than half the width of an adjacent one of said data lines and
    wherein a light-transmitting region through which light may pass is disposed between said one of said gate lines and said outer edge of said reflecting film which does not overlap an inner edge of said adjacent gate line and between an inner edge of a data line and a side of an outer edge periphery of said reflecting film in each pixel.

8. The transmission-reflection type liquid crystal display device of claim 7, wherein the light-transmitting region exists between a data line adjacent to the data line connected to the second terminal of the transistor and the reflecting film in each pixel.

9. The transmission-reflection type liquid crystal display device of claim 7, wherein the reflecting film overlaps the data line connected to the second terminal of the transistor in each pixel.

10. The transmission-reflection type liquid crystal display device of claim 7, wherein the reflecting film overlaps a gate line adjacent to the gateline connected to the gate of the transistor in each pixel.

11. The transmission-reflection type liquid crystal display device of claim 7, wherein the pixel electrode is formed from an aluminum metal layer.

12. A transmission-reflection type liquid crystal display device, comprising:
    a first substrate;
    a second substrate having a predetermined space with the first substrate;
    a backlight on a lower side of the first substrate;
    a circular polarizer between the first substrate and the backlight, the circular polarizer including a cholesteric liquid crystal polarizer including a right handed helical cholesteric liquid crystal having a range of pitch values of (380 nm-800 nm)/n, where n is an average index of refraction of the cholesteric liquid crystal;
    a linear polarizer on the second substrate;
    a common electrode on an inner side of the second substrate;
    a plurality of gate and data lines on an inner side of the first substrate;
    a plurality of pixel regions being defined by the plurality of gate and data lines;
    a reflecting film functioning as a pixel electrode on the pixel regions; and
    a liquid crystal layer between the first and second substrates,
    wherein an outer peripheral edge of a side of the reflecting film is apart from one of the gate lines and one of the data lines to define a light-transmitting region between said one of the gate lines and one of the data lines and a reflecting region on the reflecting film, while an outer peripheral edge of a first opposing side of said reflecting film overlaps more than half the width of the gate line in one pixel, and an outer peripheral edge of a second opposing side of said reflecting film overlaps more than half the width of the data line in the one pixel.

13. The transmission-reflection type liquid crystal display device of claim 12, further comprising a phase shift layer between the linear polarizer and the liquid crystal layer.

14. The transmission-reflection type liquid crystal display device of claim 13, wherein the phase shift layer is a quarter wave plate.

15. The transmission-reflection type liquid crystal display device of claim 12, wherein the pixel electrode is formed from an aluminum metal layer.

* * * * *